M. W. Staples.

Wash-Boiler

No. 2816 Reissued Dec. 17, 1867

Witnesses
Thos Fusche
J A Lowrie

Inventor
M W Staples
Per Munn & Co
Attorneys

UNITED STATES PATENT OFFICE.

M. W. STAPLES, OF CATSKILL, NEW YORK.

IMPROVEMENT IN WASH-BOILERS.

Specification forming part of Letters Patent No. 62,084, dated February 12, 1867; Reissue No. 2,816, dated December 17, 1867.

*To all whom it may concern:*

Be it known that I, M.W. STAPLES, of Catskill, in the county of Greene and State of New York, have invented a new and Improved Hydraulic Clothes-Boiler; and I do hereby declare that the following is a full, clear, and exact description thereof, which will enable others skilled in the art to make and use the same, reference being had to the accompanying drawing, forming part of this specification.

The object of my invention is to make a portable wash-boiler, wherein the clothes are washed or cleansed by the simple operation of boiling, thus dispensing with the aid of rubbing or other mechanical means commonly used by laundresses or others in washing clothes; and the nature of my invention consists, first, in combining with a portable wash-boiler one or more tubes or conduits, in such a way as to admit of the water in the bottom of the boiler rising in them, and out at the vents in their upper ends, to flow over the clothes during the process of boiling them; second, in combining with a portable wash-boiler a perforated partition, for the purpose of supporting the clothes above the openings in the lower ends of the tubes or conduits, and admit of the water in the bottom of the boiler rising freely in them to the upper side of the clothes, to establish a circulation in the boiler; third, in combining with a portable wash-boiler a water space or chamber, separate from the clothes-chamber, by means of a perforated partition, whereby I am enabled to obtain a partial vacuum therein by the process of boiling, and thus cause the water discharged in the steam-chamber, on top of the clothes, to descend rapidly through them to discharge the dirt therefrom.

Figure 2:
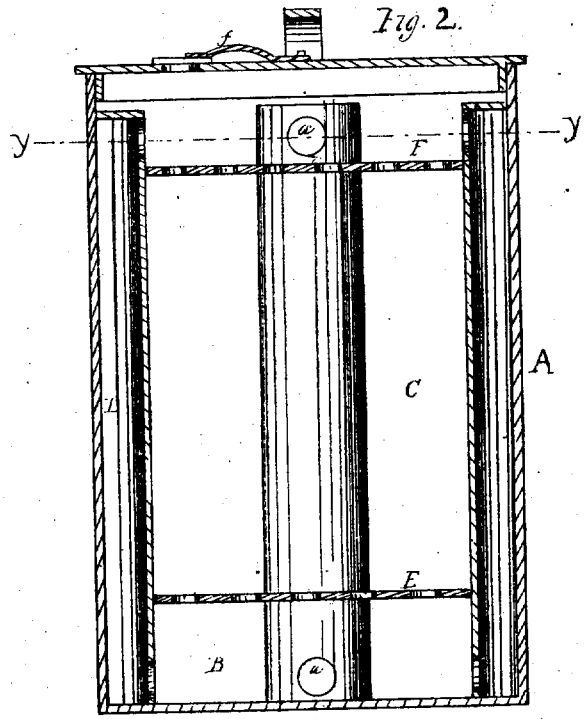
Figure 1:
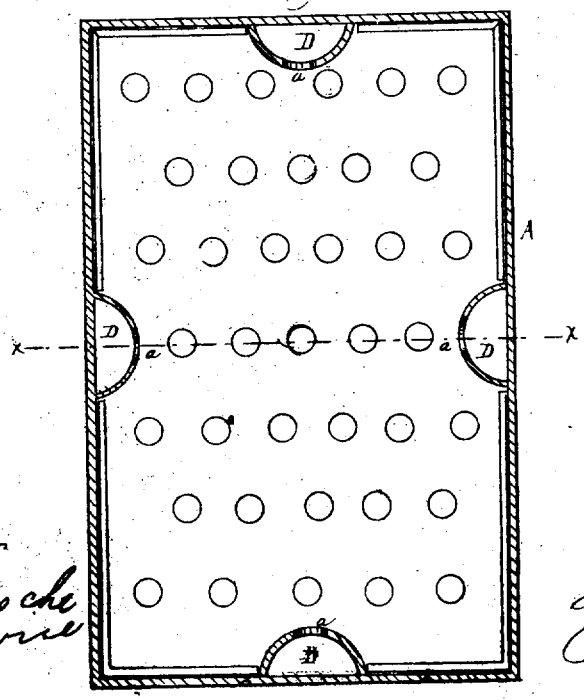

Figure 1 represents a top view or plan of the boiler through the line *y y* of Fig. 2. Fig. 2 is a section of Fig. 1 through the line *x x*.

Similar letters of reference indicate like parts.

A represents the boiler. It may be made of any desired size and of any suitable material. There are two chambers in the boiler. The lower one is for water, and the other one for the clothes. There is also a space above the clothes-chamber.

B represents the water or lower chamber. C is the clothes-chamber. The partition between the two chambers is a perforated plate, made fast in the boiler, if desired; or it may be placed in loose and rest on brackets. Above this chamber there is a perforated partition-plate resting on brackets, and which is easily removed when the boiler is to be filled. Upon each of the four sides of the boiler there are tubes D, which communicate with the water-chamber at or near their bottom ends, and extend up to near the top of the boiler. The upper ends may be closed; but there are holes through the sides near their tops. These apertures, which allow of communication between the water-chamber and the space above the clothes-chamber, are marked *a*.

It will be obvious that it is not material as to the number of tubes or conduits used, nor as to their form or place of adjustment, whether attached to the outside or inside of the boiler, nor whether they be attached to the perforated partition E instead of to the sides of the boiler, as in either case they act equally well in carrying out my method or process of washing or cleansing clothes.

The object of the perforated partition E is, first, to form a support for the clothes in the boiler, so that by means of the perforations in the partition the water can be rapidly carried back to the water-chamber again, to keep up the circulation of it in the boiler, which could not be done if the partition were not perforated; second, to form a water-chamber, B, in the boiler separate from the clothes-chamber C, so as to have the clothes, as it were, suspended between a steam-chamber formed above the clothes, under the cover of the boiler, and the water-chamber, and thus admit of the boiling water circulating rapidly through the clothes, to free them from dirt.

Letter F is a loose perforated plate, intended as a cover to hold the clothes down in the boiler. Its use, however, is not essential to the operation of the boiler, and may be dispensed with at pleasure.

The operation of my invention is as follows: I first fill, or nearly so, the chamber B with soap water or suds. I next put the clothes, which have been previously wet or soaked in water, into the chamber C. The cover of the boiler is now put on and the whole placed on the fire or otherwise heated, so as to cause the water to boil. Immediately the water begins to boil it will rush up through the tubes D, or other conduits leading from the water-chamber, and out at their upper ends or orifices, *a*, into the space above the clothes, and flood their upper surfaces. By this operation it will be obvious that a partial vacuum is established in the chamber B, to fill which the water rapidly descends through the clothes, from whence it is as rapidly expelled again up through the tubes or other conduits to the upper side of the clothes, and thus, by the constant change of water through them, the dirt is entirely discharged in a few minutes' time, and only needing to be rinsed in clear water and wrung out and dried to complete the entire washing operation.

To provide for any over-pressure in the boiler, a safety-valve, *f*, is attached to the cover.

Having now described my invention and its operation, I will proceed to set forth what I claim and desire to secure by Letters Patent.

1. I claim, in combination with a portable wash-boiler having a perforated partition or diaphragm, E, made as described, one or more tubes or conduits, D, arranged and operating substantially as hereinbefore set forth.

2. I also claim the water space or chamber B in a portable wash-boiler, provided with a perforated partition, E, made as described, and conduits D, made and operating in the manner and for the purposes hereinbefore set forth.

The above specification of my invention signed by me this 7th day of September, 1867.

M. W. STAPLES.

Witnesses:
WM. F. MCNAMARA,
ALEX. F. ROBERTS.